US 6,745,430 B2

(12) United States Patent
Holman et al.

(10) Patent No.: US 6,745,430 B2
(45) Date of Patent: Jun. 8, 2004

(54) APPARATUS FOR CLEANING ELONGATED CYLINDRICAL FILTERS

(76) Inventors: Thomas M. Holman, 5147 SW. 3$^{rd}$ Ave., Cape Coral, FL (US) 33914; Leon D. Saba, 16900 Slater Rd., Lot 151, North Fort Myers, FL (US) 33917

( * ) Notice: Subject to any disclaimer, the term of this patent is extended or adjusted under 35 U.S.C. 154(b) by 188 days.

(21) Appl. No.: 10/042,632

(22) Filed: Jan. 11, 2002

(65) Prior Publication Data

US 2003/0131438 A1 Jul. 17, 2003

(51) Int. Cl.$^7$ .................................................. A47L 5/38
(52) U.S. Cl. ........................ 15/304; 15/303; 15/316.1; 55/294
(58) Field of Search ..................... 15/303, 304, 316.1, 15/345, 405, 406; 55/294, 302

(56) References Cited

U.S. PATENT DOCUMENTS

| 3,998,656 A | * | 12/1976 | Grotto ........................... 15/304 |
| 4,808,234 A | * | 2/1989 | McKay et al. .................. 15/304 |
| 5,143,529 A | * | 9/1992 | Means, Jr. ...................... 55/302 |
| 5,322,535 A | * | 6/1994 | Simms et al. .................. 55/294 |
| 5,584,900 A | * | 12/1996 | Zaiser et al. .................... 55/302 |
| 5,915,439 A | * | 6/1999 | Zaiser ........................... 15/304 |

* cited by examiner

Primary Examiner—Theresa T. Snider

(57) ABSTRACT

The invention is a cleaning apparatus for cleaning elongated and cylindrical filters, commonly referred to as pleated bag filters or pleated bag replacements for fabric sock filter bags, that are open on one end and closed on the other end. The filter is being rotated within a hermetically sealed cleaning chamber, air jets are reciprocated along the length of the filter in close proximity to a circumference of the cylindrical filter. The cleaning chamber is provided with a negative air pressure while the interior of the rotating filter is supplied with a positive air pressure. The air jets tend to loosen and remove the dirt from within the pleats of the filter which dirt is carried away by the negative pressure within the cleaning chamber.

13 Claims, 5 Drawing Sheets

APPARATUS FOR CLEANING ELONGATED CYLINDRICAL FILTERS

CROSS REFERENCE TO RELATED APPLICATIONS (none)

STATEMENT REGARDING FED SPONSORED R & D (none)

REFERENCE TO MICROFICHE APPENDIX (none)

BACKGROUND OF THE INVENTION

This invention relates to a device or an apparatus for cleaning cylindrical air filters that are used in trucks, heavy equipment or similar types of machinery including filters that are used in other environments. U.S. Pat. No. 4,808,234 describes an apparatus attempting to overcome the disadvantages of cleaning filters by using liquid solvents or by using a "dry" cleaning air system wherein dirt, debris and other contaminants are dislodged from a filter and are then collected by a vacuum or other suction device. In this patent, air is supplied simultaneously to the inside and the outside surfaces of the cylindrical surfaces of the filter to dislodge dirt from the surfaces. Suction collects this dislodged dirt. As the air pressure is applied, the filter is rotated horizontally about its longitudinal axis. There is no way that any dirt can be collected from the inside surface of the cylindrical filter. Furthermore in U.S. Pat. No. 4,808,234, the operator must manually reach into the cabinet of the apparatus and hold the filter while securing it to a spindle. This is awkward and hazardous. In the invention at hand, there are certain safety precautions built into the machine which will be described below.

In U.S. Pat. No. 5,143,529 discloses a filter cleaning apparatus wherein the air filter to be cleaned is mounted in an upright position in a cabinet. High pressure and opposing air nozzles are mounted for vertical movements along the inner and outer surfaces of the filter to dislodge debris therefrom. Similarly, inner and outer vacuum nozzles are mounted adjacent to and moveable with the air nozzles for suctioning off the dislodged debris. Although this apparatus facilitates handling and mounting of the filter to be cleaned on both the inside and outside surfaces, it also involves some disadvantages in that the upright filter rotates during the cleaning cycle whereby centrifugal forces may cause the dirt to be tightly pushed into the bottoms of the pleated filter which makes the cleaning of the inside surfaces more difficult. The cleaning process is also more complicated because the dirt and debris on the interior of the filter may fall from the paper filter and much of it may into the corners of the filter, which is inaccessible to the force of the vacuum. Therefore, the filter is not completely cleaned.

U.S. Pat. No. 5,584,900 includes pneumatic hammer actions to aid in dislodging dirt. In this Patent, the filter is initially mounted into the apparatus in a vertical position and thereafter is moved automatically into a horizontal position. Thereafter a carriage moves air nozzles into the interior of the rotating filter while being supported on a roller bearing which is in touch with the surface of the filter.

U.S. Pat. No. 5,915,439 discloses an apparatus for cleaning filters. The apparatus is capable by adjustments to clean filters that are contaminated on both on the inside or outside surfaces. This apparatus also includes hammer actions to aid in the dislodging of debris.

SUMMARY OF THE INVENTION

The apparatus of this invention is especially designed to handle extremely long filters with narrow diameters, commonly referred as pleated bag filters or pleated bag replacements for the original fabric sock filter bag, which until now could not be cleaned on the above identified patented machines. These filters are used in an entire different environment other than air breathing internal combustion engines. The above mentioned filters are open at both ends and the filtering action can go both ways such as from the inside out or from the outside in depending on the machinery from which the filter was taken and how it was designed. The proposed apparatus of the inventive concept is designed and constructed to handle filters from 1 to 8 feet in length having an outside diameter of approximately 5" to 6" and inside diameter of approximately 3" to 4". It should also be noted that the filters that are subject to be cleaned are closed at one end. This is so because theses filters are used in bag houses or dust rooms in various plants where there is a high incidence of environmental dust. These bag houses use a multiple of filters that are hanging from the manifolds above and with the closed ends at the bottom. Prior art devices used filter bags made out of cloth and the whole assembly had to be shaken at certain intervals to dislodge the accumulated dirt or dust. The present filters are made of pleated paper whereby they offer a much larger circumferential surface to the dirty air streaming against its outer pleated surface, whereby the outer surface will be contaminated. In order to clean these types of filters, the inventive cleaning apparatus has be somewhat differently constructed than the prior art devices discussed above.

The filters to be cleaned are held in a horizontal position with a slight clamping pressure at both ends. The clamp itself utilizes a "cap" and "cone" configuration to center the filter and to accommodate the same to their various end cap configuration. The clamp for the closed end of the filter (the "cup") is manually adjustable for the basic length of differently sized filters with the actual clamping being done by short stroke pneumatic cylinders. The other end of the clamp that holds the open end of the filter (the "cone") is rotationally mounted at one end of the cleaning chamber.

The clamp at the closed end of the filter is able to rotate freely, and the other clamp end has a direct electric motor driven gear drive to rotate the filter. This cone end will also have a passage there through to enable compressed air to be delivered into the interior of the filter during the cleaning operation as will be explained below To accommodate filters from different applications and from different environments, and with different substances thereon, the apparatus is able to rotate the filter incrementally through an adjustable number of degrees of rotation to concentrate the cleaning action on one narrow surface of the media at any one time, or to rotate the filter continuously for a random cleaning pattern.

The compressed air nozzles are moved laterally back and forth along the length of the filter using a roller bearing style linear guide system and a direct electric motor driven rack and pinion drive.

The length of travel for the nozzles is defined by a first and fixed limit switch at the turn table end of the cleaning chamber and another or second limit switch is triggered by the movable part of the clamp.

Both the turntable motor for rotating the filter and the nozzle motor for the lengthwise travel for the nozzle are located outside of the cleaning chamber to avoid any kind of contamination of the motors from the cleaning environment in the cleaning chamber.

DETAILED DESCRIPTION OF THE INVENTION

Figure 1:
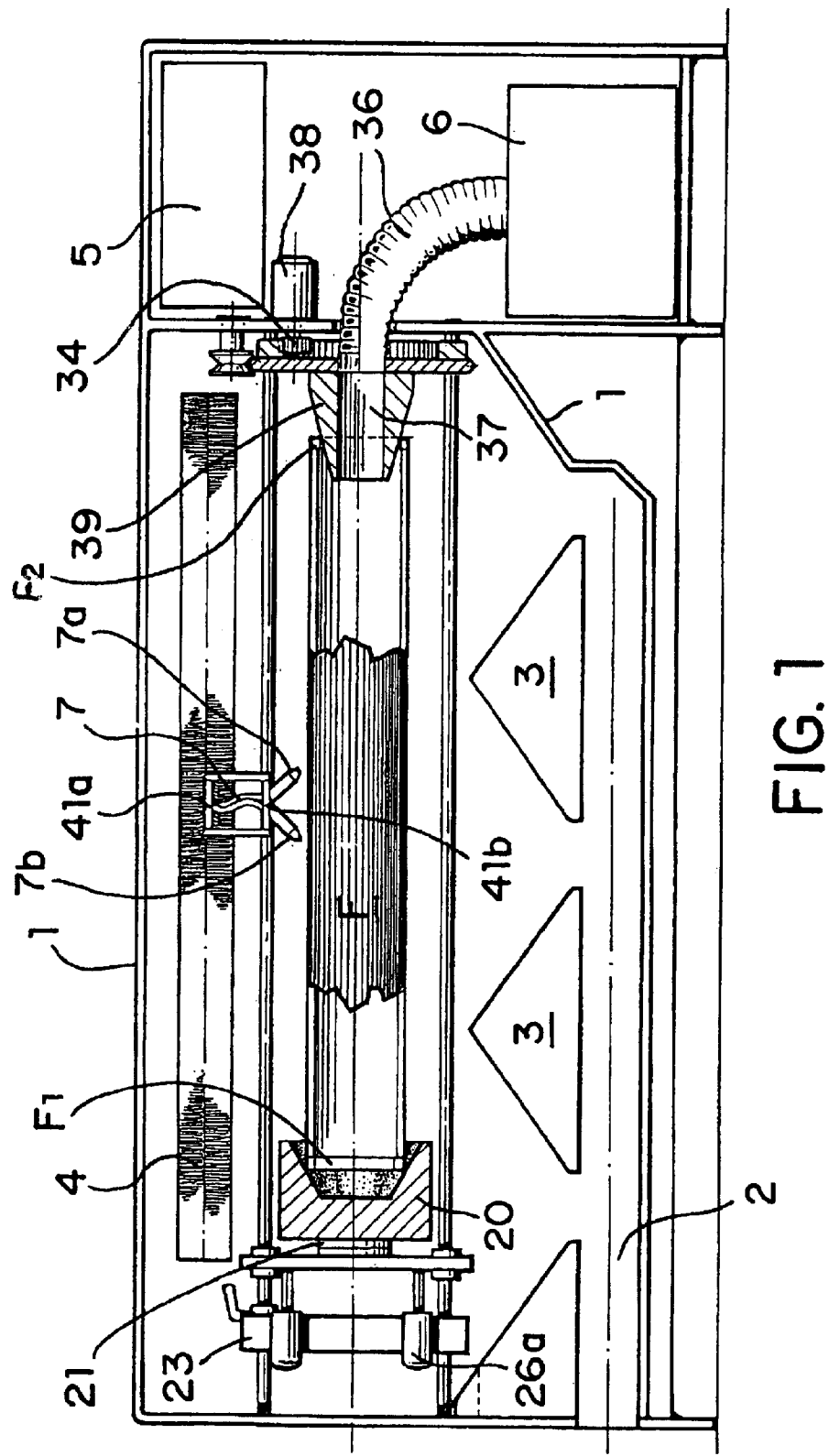
FIG. 1 is a frontal view of the filter cleaning apparatus showing schematically the cleaning process.

Turning now to FIG. 1 which illustrates the overall view of the filter cleaning apparatus in a frontal view. The cleaning apparatus includes a completely enclosed chamber 1 that contains the filter to be cleaned and the instruments immediately involved in the cleaning process. The filter has been identified as F and has two ends. one end is open and the other end is closed. The closed end is identified as F1 and is received in a freely rotating cup 20 which will be explained in more detail in FIG. 2. The other end F2 is an open end and will be received on a cone-shaped driven element 39 which will be explained in more detail with reference to FIG. 3 below. As will be explained in the operation of the apparatus below, the chamber or cabinet 1 is under a negative pressure to suck off dust or dirt laden air through manifolds 3 into the bottom suction tube 2. As will be explained in more detail below, there is a filter cleaning assembly carrying two air jets 7a and 7b. Also on the cleaning apparatus there is mounted a control panel 5 which controls the overall operation of the apparatus. Also FIG. 1 illustrates a positive pressure blower 6 which will be explained in more detail below with reference to other Figs. and in the operation of the apparatus. FIG. 1 also shows a brush system at 4 which isolates the exterior of the apparatus from the interior in that only an upper plate 41a passes through the brush system 4 as the upper plate 41a reciprocates back and forth, again, as will be explained below.

Figure 2:
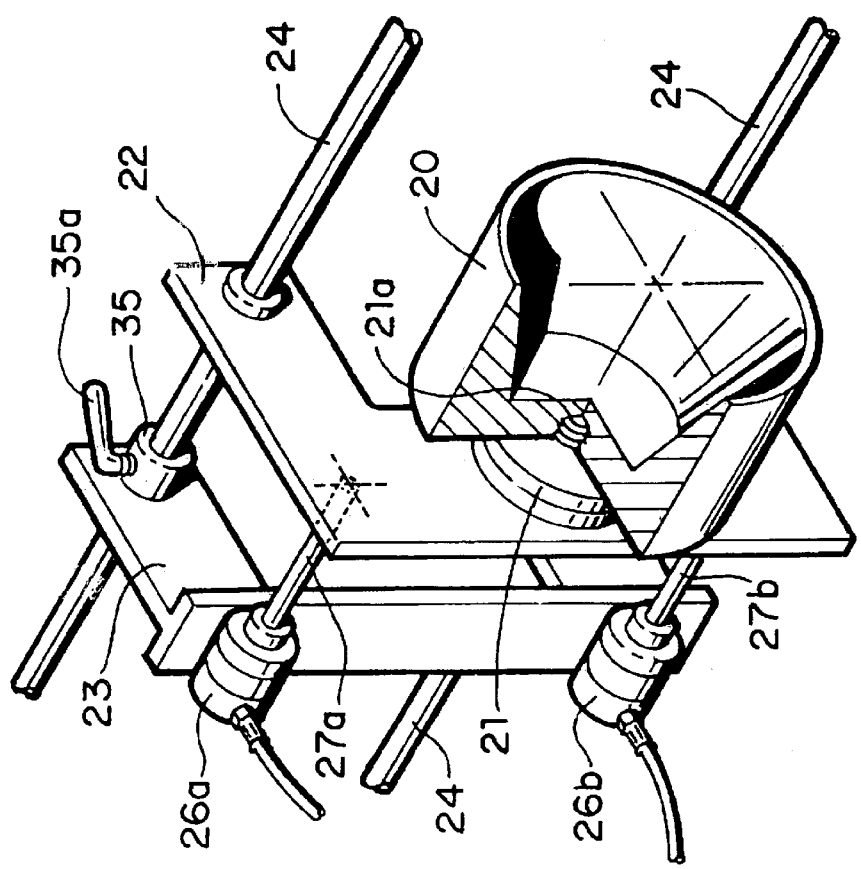
FIG. 2 shows a free-wheeling cup to receive the closed end of the filter to be cleaned.

Turning now to FIG. 2 which shows the freely turning receiving cup 20 of FIG. 1 in more detail. The freely turning cup 20 is supported on a freely turning plate 21 by way of screw threads 21a. The freely turning plate 21 is supported on a back-up plate 22 which can slide on support shafts 24. The back-up plate 22 is restrained in its movement by a second support plate 23 by way of air cylinder shafts or pistons 27a and 27b which are in a rigid connection with the first support plate 22. The second support plate 23 can also slide on the support shafts 24. The second support plate 23 also carries a sleeve 35 having an arresting handle 35a thereon for the purpose of roughly adjusting a given length of filter first within the chamber 1 and the freely rotating cup 20 and to thereafter make a fine adjustment by way of the air cylinders 26a and 26b and the piston shafts 27a and 27b, respectively. The freely rotating cup 20 has an interior which has an inverted cone shape which will center the closed end F1 of the filter F to be cleaned therein once the air cylinders 26a and 26b make their fine adjustment.

Figure 3:
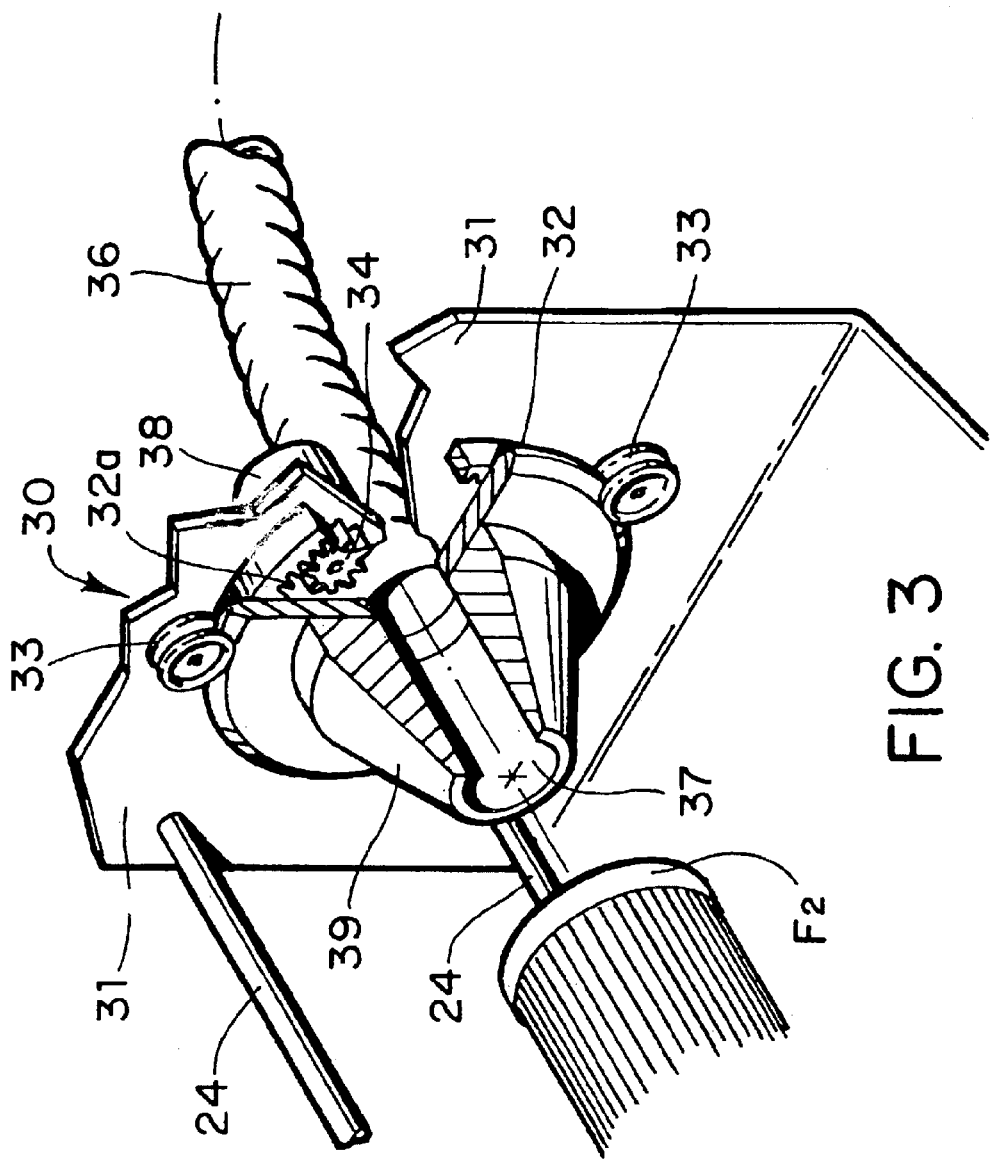
FIG. 3 shows the driven end of the open end of the filter to be cleaned.

Turning now to FIG. 3 which shows the open end F2 of the filter F and how the filter F is received on a cone-shaped element 39. The cone-shaped element 39 is rotatably supported on a second support plate 31 which is supported within the cleaning chamber 1 and includes the support shafts 24. The cone-shaped element 39 is mounted on a tapered ring 32 that rides in grooved idler wheels 33 which are attached to the second support plate 31. The cone-shaped element 39 is rotated by way of a ring gear 32a which is attached to the tapered ring 32, making up the complete rotating assembly. The ring gear 32 itself is driven by an internal driving pinion 34 which is driven by a motor 38 mounted on the outside of the second support plate 31 which is outside of the cleaning chamber 1. When in operation, the inside of the filter F is under air pressure which is supplied through the internal passage 37 of the cone-shaped element 39 by way of an air hose or duct 36.

Figure 4:
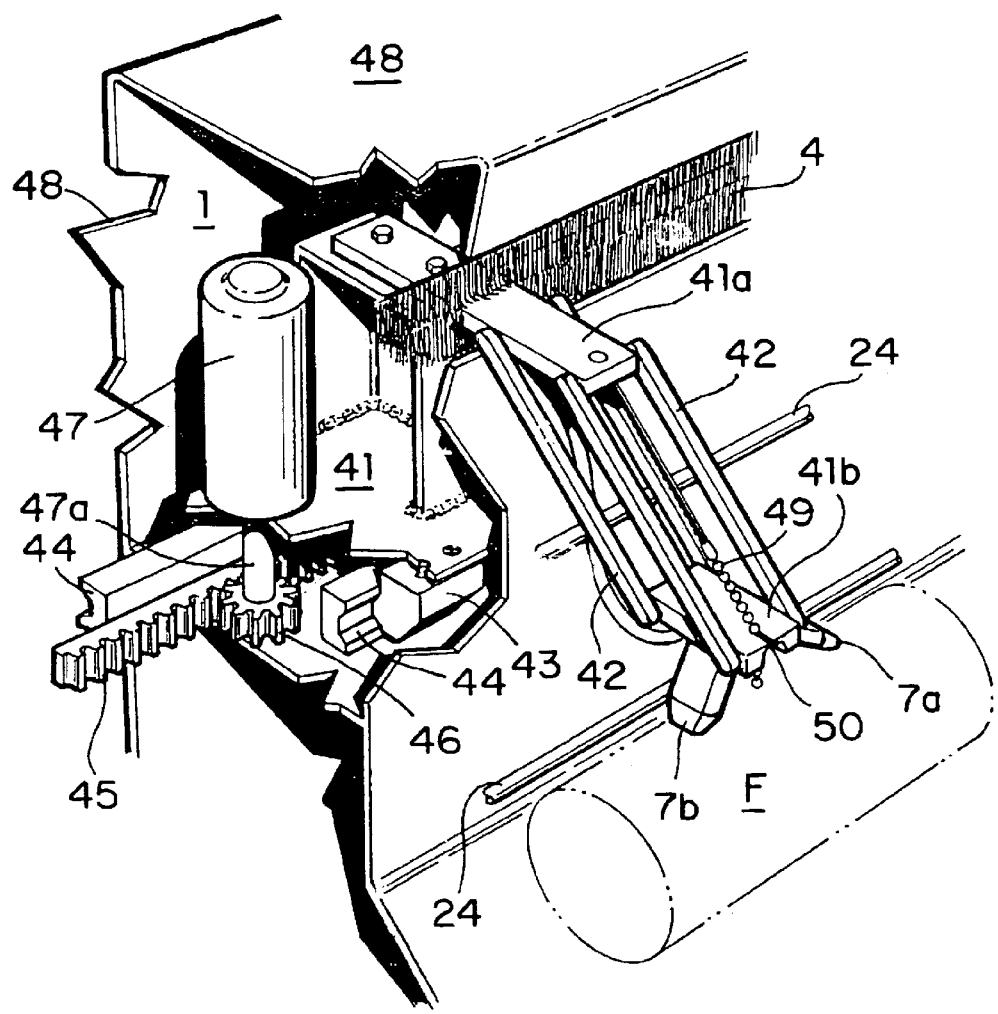
FIG. 4 illustrates the moving carriage that effects the cleaning of the filter.

FIG. 4 illustrates the inside and the outside of the cleaning chamber 1. The outside of the cleaning chamber 1 shows a sliding carriage 41. The carriage 41 has two sliding elements 43 (only one is shown) which slide in guides 44 which are mounted rigid with the housing. Mounted on the carriage 41 is an electric motor 47 which has mounted on its driven shaft 47a a pinion 46 which is in mesh with geared rack 45. An operation of the motor 47 traverses the carriage along the full length and on the outside of the cleaning chamber. Other ways can be employed to affect the traversing of the cleaning chamber. In one embodiment a motor driven chain could be used to have the same moving effect. Such a chain drive could be a reciprocating chain or a continuously running chain wherein the upper and lower runs alternatingly drive the carriage along. A different embodiment could involve a cable drive running on the same principle as was explained with the chain drive. However, a rack and pinion drive is preferred because of its reliability.

Continuing now with FIG. 4, the inner cleaning chamber 1 is substantially sealed from the ambient atmosphere by way of two opposing brush elements 4. Extending through the brush elements 4 is an upper support plate 41a which on the other side of the brush elements 4 is supported at an upper end of the carriage 41 and therefore moves along with the carriage 4. The upper support plate 41a has a parallelogram type element supported therefrom which in turn supports a lower support plate 41b. The four arms of the parallelogram are indicated at 42. The lower support plate 41b has depending therefrom two air jets 7a and 7b which are oriented toward the filter F in opposite directions. The purpose of the parallelogram is to keep the air jets precisely at dead top center of the filters to be cleaned when different diameter filters are being used. The adjustment to a different size filter can simply be accomplished by using a ball chain 49 with its upper end fastened to the upper support plate 41a and the lower end adjustably fastened to the lower support plate 41b which has a forwardly opening slot 50 therein. When, for example, the lower support plate 41b has to be raised because of a larger diameter filter to be cleaned, the ball chain 49 is slid out of the slot 50 on the lower support plate 41b and the next higher ball or balls are re-engaged within the slot 50 and the air jets are now supported at a higher elevation while remaining dead center of the outer periphery of the filter. It is again reiterated that the forward part of FIG. 4 including the filter cleaning are located within the completely enclosed chamber 1 and that this enclosed chamber is under negative air pressure.

Figure 5:
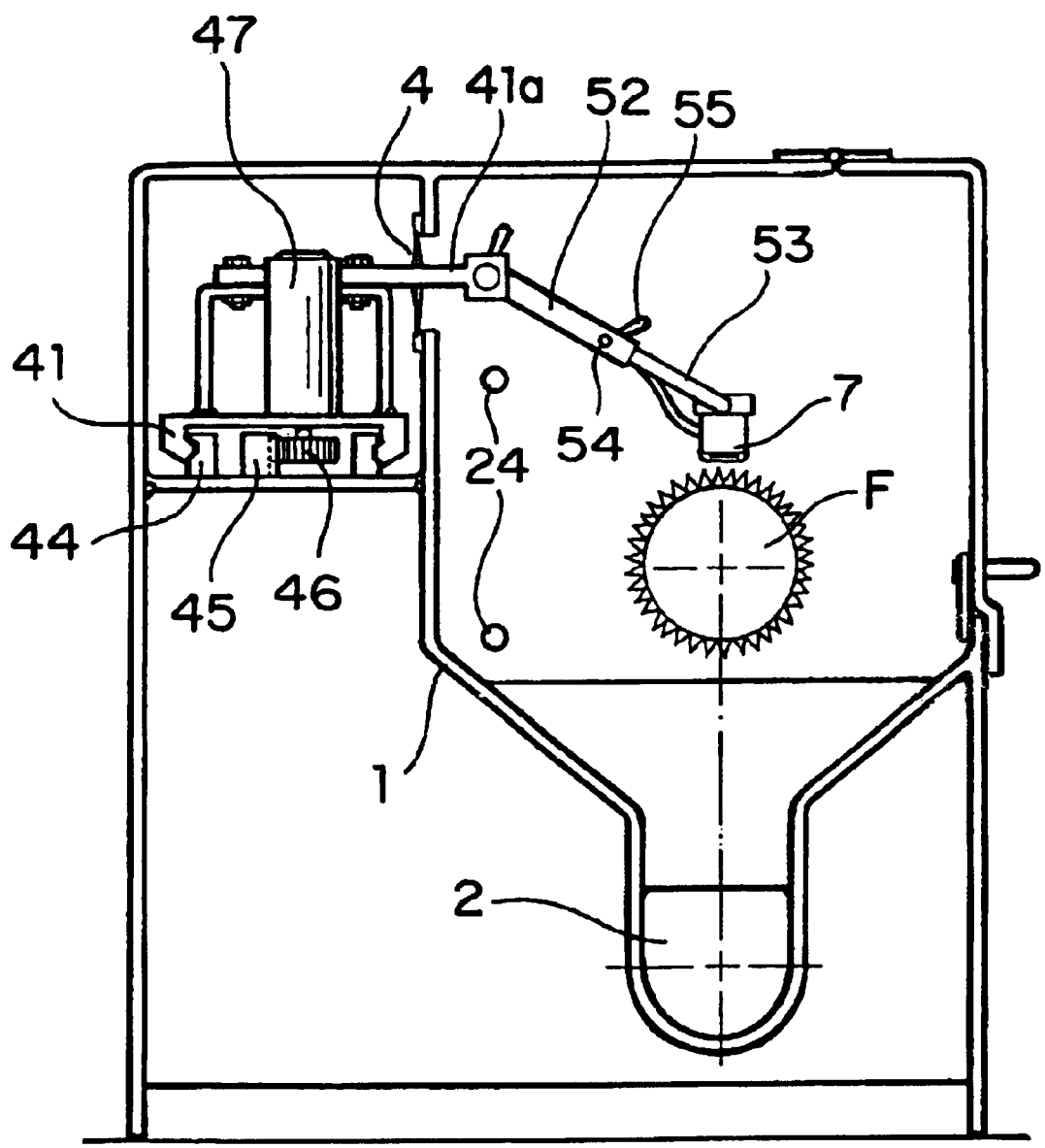
FIG. 5 is a side view of the overall filter cleaning apparatus.

Turning now to FIG. 5 which shows a side view of the cleaning apparatus. Like reference characters have been used to identify the same elements as were us described in previous Figs. The filter F is identified as being pleated and the depending supporting parallelogram type device of FIG.

4 has been changed to a simplified support element. To this end, the upper support plate 41a has now depending therefrom at a downward slant two plates 52 and 53 which are adjustable relative to each other so as to change their length by way of a bolt 64 passing through both plates and a wing nut 55 to keep the plates 52 and 53 in adjusted position depending upon the outer diameter of the filter F.

Operation of the Apparatus

Depending on the length of the filter, a filter F with its closed end is first placed into the receiving cup 20 and a rough adjustment relative to the receiving cone 39 at the other end of the apparatus is made by way of the rough length adjustment 35 and 35b. The control panel 5 will now give signals to activate the air cylinders 26a and 26b to properly seat the filter F with its open end on the cone 39. As a next step, either the parallelogram type device is properly adjusted by using the ball chain 49 in its correct location to achieve a correct distance of the air jets 7a and 7b from the outer circumference of the filter, or as a different embodiment as shown in FIG. 5, the plates 52 and 53 are adjusted relative to each other by way of the wing nut 55, again to obtain the correct distance of the air jet 7 relative to the outer circumference of the filter.

As a next step, the interior of the cleaning chamber 1 is set under negative pressure by way of the suction tube 2 and the interior of the filter is set under positive pressure by way of the pressure of the pressure hose 36. All filters of this type to be cleaned are always dirty on the outside.

As a next step, the motor 38 is activated for the rotation of the filter F. This may be in the form of a continuous rotation or incremental rotation depending on how soiled the filter is and what other material has been collected on the filter.

Next the lateral movement of the air jets is activated by way of the electric motor 47. The lateral movement may be a continuous sweep back and forth across the filter F or it may be performed in a stepwise motion again depending on how soiled the filter is and again what other material has been collected on the filter. In a stepwise motion the air jets have a chance to momentarily dwell on any particular spot. The air jets are now activated and the operation begins all depending on the settings of the control panel 5.

It should be noted that in FIG. 4 the air jets 7a and 7b are slanted downwardly but in opposite directions. In this manner, the air jets have a chance to direct their streams downwardly but in a slanted mode to dig the dirt out of the pleats rather than blowing directly on top of the dirt. At the same time it should be noted that the internal air pressure within the filter prevents any dirt or dust from being pushed through the filter medium into the interior of the filter.

What we claim is:

1. An apparatus for cleaning elongated and cylindrical filters having an open end and a closed end comprising an enclosed cleaning chamber, means within said chamber for supporting said closed end of said filter in a freely rotating cup and means for supporting said open end of said filter on a cone-shaped element, means for driving said cone-shaped element to thereby rotate said filter, means for jetting air onto an outer circumference of said filter while it is rotating, said means for adjustable supporting the means for jetting air inside said cleaning chamber in close proximity to said outer circumference, means for lateral moving said means for jetting air along said length of said filter in a back and forth motion, said means for driving said cone-shaped element and said means for lateral moving said means for jetting air are both located on the outside of the cleaning chamber, wherein said means for adjustably supporting said means for jetting comprises a parallelogram shaped element to keep said means for jetting at a top dead center of said filter regardless of the diameter of said filter.

2. The apparatus of claim 1, wherein said means for jetting comprises two air jets with each of said jets being slanted downwardly and forwardly of the length of said filter but in opposite directions.

3. The apparatus of claim 1 including means for keeping said means for jetting at an adjusted position relative to said outer circumference of said filter.

4. The apparatus of claim 1, wherein said means for lateral moving said means for jetting includes a rack and pinion gear.

5. The apparatus of claim 1, wherein said means for adjustably supporting said means for jetting air includes two plates which are movable relative to each other and which two plates carry said means for jetting air at a downward end, said two plates have means for arresting said two plates to each other and relative to a proximity of said circumference of said filter.

6. The apparatus of claim 1, wherein said means for jetting alt has at an upper end thereof an upper support plate, said upper support plate extends through a means for sealing said interior of said chamber from the ambient air on the outside, said upper support plate is mounted on a slidable carriage constituting the means for lateral moving said means for jetting air.

7. The apparatus of claim 6, wherein said means for sealing are opposing brushes through which said upper support plate slides.

8. The apparatus of claim 1, wherein said freely rotating cup is supported on a backup plate, said backup plate having means for roughly adjusting said backup plate to any given length of said filter.

9. The apparatus of claim 8 including means for finely adjusting said freely rotating cup to any given length of said filter after operating said means for roughly adjusting.

10. An apparatus for cleaning an elongated and cylindrical filter having an open end and a closed end, said apparatus comprising an inner cleaning chamber having means for hermetically sealing it from an outside ambient air, means for rotating said filter in said cleaning chamber, means for inducing a negative pressure within said cleaning chamber, means for inducing a positive pressure within said filter through said open end, means for supplying compressed air onto an outside circumference of said filter, said means for supplying compressed air is reciprocating laterally along the length of said filter in a back and forth motion, including opposing brush means constituting said means for hermetically sealing.

11. The apparatus of claim 10, wherein means for supplying said compressed air has means for driving said means for reciprocating laterally along said length of said filter.

12. The apparatus of claim 11, wherein both of said means for rotating said filter and said means for driving said means for reciprocating are located outside of said inner cleaning chamber.

13. The apparatus of claim 10, wherein said means for supplying compressed air includes means for adjusting said means for supplying air relative to the outer circumference of said filter.

* * * * *